United States Patent Office 3,407,221
Patented Oct. 22, 1968

3,407,221
OXIDATION OF OLEFINS TO CARBOXYLIC ACIDS IN THE PRESENCE OF CERIUM SALTS AND NITRIC ACID
Eugene F. Lutz, Concord, Calif., assignor to Shell Oil Company, New York, N.Y., a corporation of Delaware
No Drawing. Filed Dec. 16, 1966, Ser. No. 602,143
6 Claims. (Cl. 260—413)

ABSTRACT OF THE DISCLOSURE

Alpha- and beta-olefins are oxidized to carboxylic acids by intimately contacting the olefin in liquid phase with an oxygen-containing gas in the presence of an oxidation catalyst consisting of a cerium salt and nitric acid.

The present invention relates to an improved process for the oxidation of olefins to carboxylic acids. More particularly, it relates to an improved process for the oxidation of $\alpha$- and $\beta$-olefins with free oxygen in the presence of a cerium salt-nitric acid mixture as catalyst.

The prior art

Catalytic oxidation with molecular oxygen is carried out with different materials under the most varied conditions. Various metals, metal oxides and salts have been proposed as catalysts; nickel, copper, platinum, silver, the oxides of vanadium, zinc, aluminum, as well as the salts of cobalt and manganese, have proved especially effective. The readily controlled continuous catalytic oxidation in the gas phase is often used, e.g., the oxidation of alcohols to aldehydes and acids or to ketones. In some cases, the oxidation in heterogeneous liquid/gas phase, in which the oxygen is blown through the reaction materials, has attained technical importance, as in the oxidation of paraffins to fatty acids or the oxidation of hydrocarbons to peroxides.

Fasce, in U.S. 2,537,577, issued Jan. 9, 1951, discloses a process for the oxidation of a mixture obtained from a conventional oxo synthesis containing, inter alia, aldehydes, alcohols and olefins, using cobalt oleate or other heavy metal soaps as catalysts for air oxidation. According to the process of that patent, the more branched compounds are converted to acids, while the straight-chain olefins, alcohols and aldehydes are converted to neutral compounds.

Various other methods have been proposed for the oxidation of olefins, particularly oxidations involving the use of heavy metal salts. For example, Grinstead, in U.S. 3,048,636, issued Aug. 7, 1962, discloses a process for olefin oxidation using thallium (III) salts in aqueous or organic media. The thallic salt is reduced to the thallous form during the oxidation, but the thallous salt must be oxidized separately back to the thallic form for reuse.

Long-chain fatty acids in the soap range, i.e., about $C_6$ to $C_{20}$, are important, particularly in the soap-making industry. Many of the naturally occurring acids used in the manufacture of soaps and/or detergents, for example, coconut acids, are often in short supply, while the demand for these acids continually increases. There is, therefore, a need for efficient methods for synthesizing these fatty acids.

The objects

It is an object of the present invention to provide an improved process for the oxidation of mixtures of normal olefins in which the ethylenic unsaturation occurs in the $\alpha$- or $\beta$-position along the olefin chain, to carboxylic acids. Another object is to provide a process for the oxidation of normal olefin mixtures, in which the olefinic compounds contain, for example, from about 4 to about 20 carbon atoms, by providing a catalyst which will selectively oxidize the olefins to carboxylic acids in which the ethylenic unsaturation occurs in the $\alpha$- or $\beta$-position.

Other objects, aspects and advantages of the invention will become apparent from the following description.

The invention

It has now been found that cerium salts, in conjunction with nitric acid, are highly effective catalysts for the selective conversion by free oxygen (or air) of $\alpha$- and $\beta$-ethylenically unsaturated hydrocarbons, i.e., $\alpha$- and $\beta$-alkenes, to carboxylic acids.

In general, the oxidation can be described by the following equation:

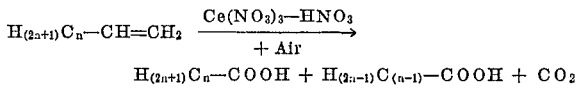

$$H_{(2n+1)}C_n\text{—}CH\text{=}CH_2 \xrightarrow[\text{+ Air}]{Ce(NO_3)_3\text{—}HNO_3}$$
$$H_{(2n+1)}C_n\text{—}COOH + H_{(2n-1)}C_{(n-1)}\text{—}COOH + CO_2$$

wherein $n$ is an integer from 1 to 18.

The olefin

The alkenes oxidized according to the process of the invention are preferably olefins in which the unsaturation occurs in the $\alpha$- or $\beta$-position. However, the charge to the oxidation zone may be mixtures of olefins which are terminally or internally unsaturated, and in which the unsaturation occurs in positions other than the $\alpha$- or $\beta$-position. The olefins may be straight-chain or branched-chain alkenes, and contain from about 4 to about 20 or more carbon atoms in the chain. Example of straight-chain olefins which are suitable for use in the process of the invention are propylene, 1- and 2-butene, 1- and 2-hexene, 1- and 2- octene, 1- and 2-nonene, 1-decene, 2-decene, 1-undecene, 2-decene, and so forth, up to and including 1- and 2-hexadecene, 1- and 2-octadecene, 1- and 2-nonadecene, and 1- and 2-eicosene. Branched chain olefins in which the unsaturation occurs in the $\alpha$- or $\beta$-position may also be employed, provided that the branching occurs in other than the $\beta$-position for $\alpha$-olefins, or in the $\gamma$-position for $\beta$-olefins.

In the oxidation, it has been found that the oxidation of $\alpha$-olefins is most rapid; $\beta$-olefins will be oxidized, but at a slower rate than olefins in which the unsaturation occurs in the terminal or alpha position of the chain. Olefins containing internal unsaturation beyond the $\beta$-position, e.g., 3-hexadecene, oxidize very slowly, if at all.

The olefins to be oxidized may be obtained from any conventional source, such as paraffin wax-cracking, paraffin thermal or catalytic dehydrogenation, or growth polymers, such as those from ethylene, by use of the so-called "Ziegler" aluminum-containing catalysts. The mixture of olefins is preferably predominantly $\alpha$- and $\beta$-olefins. The olefin mixture need not necessarily be composed solely of olefins, but may contain substances which are inert or do not adversely affect the reaction, such as paraffins or aldehydes. The olefin mixture may, however, be pretreated to remove the non-olefin constituents.

The catalyst

In accordance with the process of the invention, the oxidation of the olefin mixture (i.e., the mixture of $\alpha$-, $\beta$-, $\gamma$-, etc., alkenes) is carried out in liquid phase in the presence of a cerium-nitric acid catalyst. Cerium may be charged as either Ce(III) or Ce(IV), so long as the cerium-containing compound is soluble in the reaction medium. Cerium salts of either inorganic or organic acids can be used, e.g., cerous nitrate and cerous acetate. Cerous nitrate is particularly useful because of its high solubility in the solvent employed, and because of its compatibility with nitric acid, its co-catalyst. Other metal salts such as those of vanadium or cobalt or the iron group metals, give very little oxidation to carboxylic acids, yielding primarily nitrated or acetate esterification products.

In general, it is preferred to use substantially less than a stoichiometric amount of catalyst for the oxidation. While the mole ratio of cerium/olefin may satisfactorily be varied between about 1/15 and 1/0.5, it is generally preferred to use a ratio of between about 1/1.5 and 1/1.0. Within the co-catalyst system itself, mole ratios of cerium/nitric acid of between about 1/6 and 1/0.2, preferably between 1/2 and 1/1, are satisfactory.

The solvent

As already pointed out, the oxidation reaction of the invention is carried out in liquid phase in a suitable solvent. The particular solvent employed is chosen based on the solubility of the catalysts therein, and the stability and inactivity of the solvent under the reaction conditions. Paraffins, such as hexane and heptane, are not satisfactory, because of the low solubility of the cerium salts therein. In general, primary and secondary alcohols, likewise, are unsatisfactory, because of their reactivity and tendency to be oxidized. Nitriles, such as acetonitrile and butyronitrile, tend to favor nitration rather than oxidation, and low yields of product acid are obtained.

It has been found that the most satisfactory solvents for the reaction of the invention are the low-molecular-weight, especially normal, paraffinic acids, such as acetic, propionic, n-butyric and n-valeric acids. Some ester formation occurs during the reaction, by reaction of the olefin reactants with the paraffin acids, the acids adding to the olefin at the point of unsaturation, thus producing an ester. The ester by-product may undergo nitration, to form a nitro-substituted ester. Thus, the nitration and esterification by-products are the two major contaminants in the acid product.

Because of its availability and low cost, it is preferred to use acetic acid as the solvent. The acid may be used in an essentially concentrated form, or diluted with water; however, it is preferred that the water content of the solvent not exceed about 15%, still more preferably 10%, by weight.

The reaction conditions

The upper temperature at which the oxidation is effected is limited only by the boiling point of the solvent. For example, when acetic acid is used as solvent, it is preferred to operate at temperatures between about 110° and 115° C.; with propionic acid, temperatures up to about 140° C. are permissible; with butyric acid, the upper limit of the temperature range would be about 160° C.; and so forth. It is preferred, in general, to operate at temperatures above about 100° C., preferably above about 110° C, in order to minimize the reaction time. Temperatures below about 85° C. are conducive to low oxidation yields.

The reaction time is limited not only by the temperature employed, but also by the rate of olefin addition to the catalyst/solvent mixture. It is generally preferred, however, to permit the reaction to continue until at least about 75%, preferably about 85%, of the olefin reactants have been converted.

The oxidation may be run at atmospheric, subatmospheric or superatmospheric pressures. Generally, the pressure is not critical; it is, however, preferred to use pressures between about atmospheric and about 30 p.s.i.g.

In general, the olefin is added slowly to the reaction mixture in order to maintain a low olefin concentration therein, to minimize the formation of by-products.

The following examples are given for illustrative purposes only, and are not to be considered as limiting the invention.

The examples

Into a three-neck round-bottom glass flask equipped with a magnetic stirrer was introduced a mixture of cerium (III) nitrate and concentrated nitric acid (70%) in acetic acid. Olefin was introduced dropwise through a dropping funnel through one neck of the flask; a second neck of the flask held a dip tube, through which oxygen was introduced. The third neck of the flask contained a reflux condenser. Table I, below, summarizes the pertinent reaction conditions and product yields obtained from several runs using this apparatus. All runs were made at atmospheric pressure.

TABLE I

| Olefin, moles | Solvent, cc. | Catalyst, moles | Rate of $O_2$ Addition, cc./min. | Temp., °C. | Time, hr. | Conversion, percent (basis olefin) | Remarks |
|---|---|---|---|---|---|---|---|
| 1-hexadecene, 0.1 | Acetic acid, 200. | $Ce(NO_3)_3 \cdot 6H_2O$, 0.0375+Conc. $HNO_3$, 0.125. | ~25 | 111-114 | [1]2 / 4 | 84 | Selectivity to: $H_{29}C_{14}COOH=60.2\%$; $H_{27}C_{13}COOH=31.2\%$; $H_{25}C_{12}COOH=5.7\%$; Other=2.9%; 0.43 mole acid/mole $HNO_3$. |
| Do | do | $Ce(NO_3)_3 \cdot 6H_2O$, 0.0625+Conc. $HNO_3$, 0.125. | ~37 | 114 | [1]1.5 / 2.0 | 92 | 0.47 mole acid/mole $HNO_3$. |
| Do | Acetic acid, 195. | $Ce(NO_3)_3 \cdot 6H_2O$, 0.0625+Conc. $HNO_3$, 0.125. | ~55 | 113 | [1]3.5 / 4.0 | | 0.42 mole acid/mole $HNO_3$. |
| 1-hexadecene, 0.15 | Acetic acid, 250. | $Ce(NO_3)_3 \cdot 6H_2O$, 0.125+Conc. $HNO_3$, 0.125. | 55-90 | 110-114 | [1]3.0 / 3.5 | 94 | Solution held at reflux for 0.5 hr. before olefin addition begun. 1.5 mole acid/mole $HNO_3$. 47.3% $NO_2$ recovered. |
| 1-hexadecene, 0.2 | Acetic acid, 450. | $Ce(NO_3)_3 \cdot 6H_2O$, 0.075+Conc. $HNO_3$, 0.25. | 40 | 113 | [1]3.0 / 4.0 | 67 | Selectivity to: $H_{29}C_{14}COOH=57.0\%$; $H_{27}C_{13}COOH=32.9\%$; $H_{25}C_{12}COOH=7.4\%$; Other=2.8%; 48.8% $NO_2$ recovered; 0.5 mole acid/mole $HNO_3$. |
| 1-octene, 0.3 | Propionic acid, 185. | $Ce(NO_3)_3 \cdot 6H_2O$, 0.025+Conc. $HNO_3$, 0.125. | 25 | 108-120 | 4.5 | 27 | Selectivity to: $H_{13}C_6COOH=60.24\%$; $H_{11}C_5COOH=20.47\%$; $H_9C_4COOH+H_7C_3COOH=9.14\%$; Acetic acid=10.15%; 0.58 mole acid/mole $HNO_3$. |
| 1-octene, 0.3 | Propionic acid, 205. | $Ce(NO_3)_3 \cdot 6H_2O$, 0.0375+Conc. $HNO_3$, 0.125. | 75 | 104-118 | [1]3.75 / 12 | 24.4 | Selectivity to: $H_{13}C_6COOH=52.8\%$; $H_{11}C_5COOH=29.5\%$; $H_9C_4COOH+H_7C_3COOH=17.8\%$; 0.44 mole acid/mole $HNO_3$. |
| 1-octene, 0.3 | Acetic acid, 205. | $Ce(NO_3)_3 \cdot 6H_2O$, 0.0375+Conc. $HNO_3$, 0.125. | 25 | 104-111 | [1]3.75 / 4.5 | 25 | Selectivity to: $H_{13}C_6COOH=68.4\%$; $H_{11}C_5COOH=25.1\%$; $H_9C_4COOH=4.1\%$; $H_7C_3COOH=2.5\%$; 0.33 mole acid/mole $HNO_3$. |
| 1-octene, 0.07 | Propionic acid, 144. | $Ce(NO_3)_3 \cdot 6H_2O$, 0.0375+Conc. $HNO_3$, 0.125. | 25 | 116-120 | [1]0.83 / 1.25 | [2] | Selectivity to: $H_{13}C_6COOH=62.8\%$; $H_{11}C_5COOH=25.1\%$; $H_9C_4COOH=5.0\%$; $H_7C_3COOH=7.1\%$; 0.2 mole acid/mole $HNO_3$. |
| 2-octene, 0.2 | Acetic acid, 205. | $Ce(NO_3)_3 \cdot 6H_2O$, 0.0375+Conc. $HNO_3$, 0.125. | ~25 | 111 | [1]3.0 / 4.0 | [2] | 0.08 mole acid/mole $HNO_3$. |
| 2-butene, 0.32 | Butyric acid, 219. | $Ce(NO_3)_3 \cdot 6H_2O$, 0.125+Conc. $HNO_3$, 0.125. | ~25 | 110-115 | [1]2.33 / 3.33 | 54.9 | 1.4 mole acid/mole $HNO_3$. A 50/50 mixture of acetic and propionic acids was obtained as acid product. |

[1] Olefin addition discontinued after this time period; second number indicates total reaction time.
[2] Only acid portion of product analyzed.

I claim as my invention:

1. A process of oxidizing α- and β-olefins of from 4 to 20 carbon atoms to carboxylic acids by intimately contacting the olefin in liquid phase with an oxygen-containing gas in the presence of cerous nitrate and nitric acid and in the presence of a low-molecular-weight paraffinic acid solvent in which said catalyst is soluble for a time sufficient for at least 75% of said α- and β-olefins to be oxidized to carboxylic acids.

2. A process in accordance with claim 1 wherein said oxidation is carried out at a temperature from about 100° C. to about 160° C.

3. A process in accordance with claim 1 wherein the mole ratio of olefin/cerous nitrate is between about 1/15 and 1/0.5.

4. A process in accordance with claim 1 wherein the mole ratio of cerous nitrate/nitric acid in said catalyst is between about 1/6 and 1/0.2.

5. A process in accordance with claim 1 wherein the olefin is an α-olefin.

6. A process in accordance with claim 1 wherein the olefin is 2-butene.

References Cited

UNITED STATES PATENTS

| | | | |
|---|---|---|---|
| 2,285,601 | 6/1942 | McAllister | 260—533 |
| 2,323,861 | 7/1943 | Zellner | 260—533 |
| 2,662,908 | 12/1953 | Logan | 260—413 |

FOREIGN PATENTS

| | | |
|---|---|---|
| 1,243,655 | 9/1960 | France. |

NICHOLAS S. RIZZO, *Primary Examiner.*

R. V. RUSH, *Assistant Examiner.*